United States Patent
Levy et al.

(10) Patent No.: US 9,059,946 B2
(45) Date of Patent: Jun. 16, 2015

(54) PASSIVE OPTICAL NETWORK (PON) PACKET PROCESSOR

(75) Inventors: Gil Levy, Herzliya (IL); Eliezer Weitz, Holon (IL); Eli Elmoalem, Nili (IL); Gal Sitton, Netanya (IL)

(73) Assignee: Broadcom Corporation, Irvine, CA (US)

( * ) Notice: Subject to any disclaimer, the term of this patent is extended or adjusted under 35 U.S.C. 154(b) by 2410 days.

(21) Appl. No.: 11/349,917

(22) Filed: Feb. 9, 2006

(65) Prior Publication Data
US 2007/0074218 A1    Mar. 29, 2007

Related U.S. Application Data

(63) Continuation-in-part of application No. 11/238,022, filed on Sep. 29, 2005, now Pat. No. 7,643,753.

(51) Int. Cl.
H04Q 11/00 (2006.01)
H04L 12/861 (2013.01)

(52) U.S. Cl.
CPC ............ *H04L 49/9094* (2013.01); *H04L 49/90* (2013.01); *H04L 49/9073* (2013.01); *H04Q 11/0067* (2013.01); *H04Q 11/0071* (2013.01)

(58) Field of Classification Search
USPC ..................................... 398/58, 66
See application file for complete search history.

(56) References Cited

U.S. PATENT DOCUMENTS

| | | | |
|---|---|---|---|
| 5,404,463 A * | 4/1995 | McGarvey ..................... 710/308 |
| 5,930,262 A | 7/1999 | Sierens et al. |
| 6,229,788 B1 | 5/2001 | Graves et al. |
| 6,330,584 B1 | 12/2001 | Joffe et al. |
| 6,385,366 B1 | 5/2002 | Lin |
| 6,519,255 B1 | 2/2003 | Graves |
| 6,546,014 B1 * | 4/2003 | Kramer et al. ........... 370/395.41 |
| 6,934,781 B2 * | 8/2005 | Stone et al. ................... 710/118 |
| 7,171,604 B2 * | 1/2007 | Sydir et al. ..................... 714/758 |
| 7,372,854 B2 * | 5/2008 | Kang et al. ..................... 370/390 |
| 7,385,995 B2 | 6/2008 | Stiscia et al. |
| 7,428,385 B2 * | 9/2008 | Lee et al. ....................... 398/100 |
| 7,567,567 B2 * | 7/2009 | Muller et al. .................. 370/392 |
| 7,739,479 B2 * | 6/2010 | Bordes et al. ....................... 712/1 |
| 2003/0058505 A1 | 3/2003 | Arol et al. |
| 2003/0137975 A1 | 7/2003 | Song et al. |
| 2004/0136712 A1 | 7/2004 | Stiscia et al. |
| 2004/0202470 A1 | 10/2004 | Lim et al. |
| 2004/0208631 A1 | 10/2004 | Song et al. |
| 2004/0218534 A1 | 11/2004 | Song et al. |
| 2004/0264961 A1 | 12/2004 | Nam et al. |

(Continued)

OTHER PUBLICATIONS

A. Kamil, Notes for CS162, Spring 2004, Discussions 2, 3 and 4, 2004.*

(Continued)

*Primary Examiner* — Shi K Li
(74) *Attorney, Agent, or Firm* — Sterne, Kessler, Goldstein & Fox P.L.L.C.

(57) ABSTRACT

A passive optical network (PON) packet processor for processing PON traffic includes a core processor for executing threads related to the processing of PON traffic and a plurality of hardware (HW) accelerators coupled to the core processor for accelerating the processing of said PON traffic. A memory unit is coupled to the core processor for maintaining program and traffic data. In an embodiment of the present invention, the PON packet processor includes a scheduler that optimizes the execution of PON related tasks.

25 Claims, 5 Drawing Sheets

(56) References Cited

U.S. PATENT DOCUMENTS

| | | | |
|---|---|---|---|
| 2005/0165985 A1* | 7/2005 | Vangal et al. | 710/107 |
| 2005/0276283 A1* | 12/2005 | Gyselings et al. | 370/537 |
| 2006/0080477 A1* | 4/2006 | Seigneret et al. | 710/22 |
| 2006/0179172 A1* | 8/2006 | Ayinala et al. | 710/22 |
| 2006/0256804 A1* | 11/2006 | Kawarabata et al. | 370/412 |
| 2007/0019956 A1 | 1/2007 | Sorin et al. | |

OTHER PUBLICATIONS

MPC8260 Power QUICC II, User's Manual, *Motorola Inc.* pp. 4-1 to 4-45, (1999).

\* cited by examiner

PASSIVE OPTICAL NETWORK (PON) PACKET PROCESSOR

CROSS REFERENCE TO RELATED APPLICATION

This application is a continuation-in-part application of U.S. patent application Ser. No. 11/238,022 filed on Sep. 29, 2005, whose contents are incorporated herein by reference.

PATENT REFERENCES

| | | |
|---|---|---|
| U.S. Pat. No. 6,229,788 | May 2001 | Graves, et al. |
| U.S. Pat. No. 6,385,366 | May 2002 | Lin |
| U.S. 20030058505 | March 2003 | Arol; et al. |
| U.S. 20040202470 | October 2004 | Se-Youn; et al. |
| U.S. 20040208631 | October 2004 | Jae-Yeon; et al. |
| U.S. 20040218534 | November 2004 | Jae-Yeon; et al. |
| U.S. 20040264961 | December 2004 | Hong Soon; et al. |
| U.S. 20040136712 | July 2005 | Stiscia; et al. |

FIELD OF THE INVENTION

The present invention relates generally to communication using broadband passive optical networks (PONs).

BACKGROUND OF THE INVENTION

As the demand from users for bandwidth is rapidly increasing, optical transmission systems, where subscriber traffic is transmitted using optical networks, is installed to serve this demand. These networks are typically referred to as fiber-to-the-curb (FTTC), fiber-to-the-building (FTTB), fiber-to-the-premise (FTTP), or fiber-to-the-home (FTTH). Each such network provides an access from a central office (CO) to a building, or a home, via optical fibers installed near or up to the subscribers' locations. As the transmission quantity of such an optical cable is much greater than the bandwidth actually required by each subscriber, a passive optical network (PON), shared between a plurality of subscribers through a splitter, was developed.

An exemplary diagram of a typical PON 100 is schematically shown in FIG. 1. The PON 100 includes M optical network units (ONUs) 120-1, 120-2, through 120-M, coupled to an optical line terminal (OLT) 130 via a passive optical splitter 140. To the extent that reference is made to the ONUs without regard to a specific one thereof, such ONUs will be referenced as 120. Traffic data transmission may be achieved by using asynchronous transfer mode (ATM) cells over two optical wavelengths, one for the downstream direction and another for the upstream direction. Downstream transmission from OLT 130 is broadcast to all ONUs 120. Each ONU 120 filters its respective data according to, for example, pre-assigned ATM VPI/VCI values. ONUs 120 transmit respective data to OLT 130 during different time slots allocated by OLT 130 for each ONU 120. Splitter 140 splits a single line into multiple lines, for example, 1 to 32, or, in case of a longer distance from OLT 130 to ONUs 120, 1 to 16. Each ONU 120 is connected to a plurality of customer sites to which receives and transmits from OLT 130 through the respective ONU 120.

Traffic processing by an ONU 120 is typically performed by a packet processor that is required to serve a plurality of PON applications of different PON types (e.g., BPON, EPON and GPON) and to process multiple data streams at high rate. In addition, the packet processor should be capable of performing standard networking tasks such as bridge learning, ATM queuing and shaping, reassembling of packets, and so on.

It would be advantageous to provide a packet processor for PON applications which is capable of efficiently performing the above-mentioned tasks.

SUMMARY OF THE INVENTION

It is an object of the invention to provide a packet processor for PON applications which is capable of efficiently performing the above-mentioned tasks.

This object is realized in accordance with a first aspect of the invention by a passive optical network (PON) packet processor for processing PON traffic, said PON packet processor comprising:

a core processor for executing threads related to the processing of said PON traffic;

a plurality of hardware (HW) accelerators coupled to the core processor for accelerating the processing of said PON traffic; and a memory unit coupled to the core processor for maintaining program and traffic data.

According to another aspect of the invention there is provided a method for effective selection of PON traffic processing related threads for use by a scheduler operative in a passive optical network (PON) packet processor, said method comprising:

receiving requests for invoking said threads from a plurality of request generators;

based on a priority policy selecting a thread to be executed; and sending an identification (ID) number of the selected thread to a context manager.

BRIEF DESCRIPTION OF THE DRAWINGS

In order to understand the invention and to see how it may be carried out in practice, an embodiment will now be described, by way of non-limiting example only, with reference to the accompanying drawings, in which.

DETAILED DESCRIPTION OF EXEMPLARY EMBODIMENTS

Figure 1:
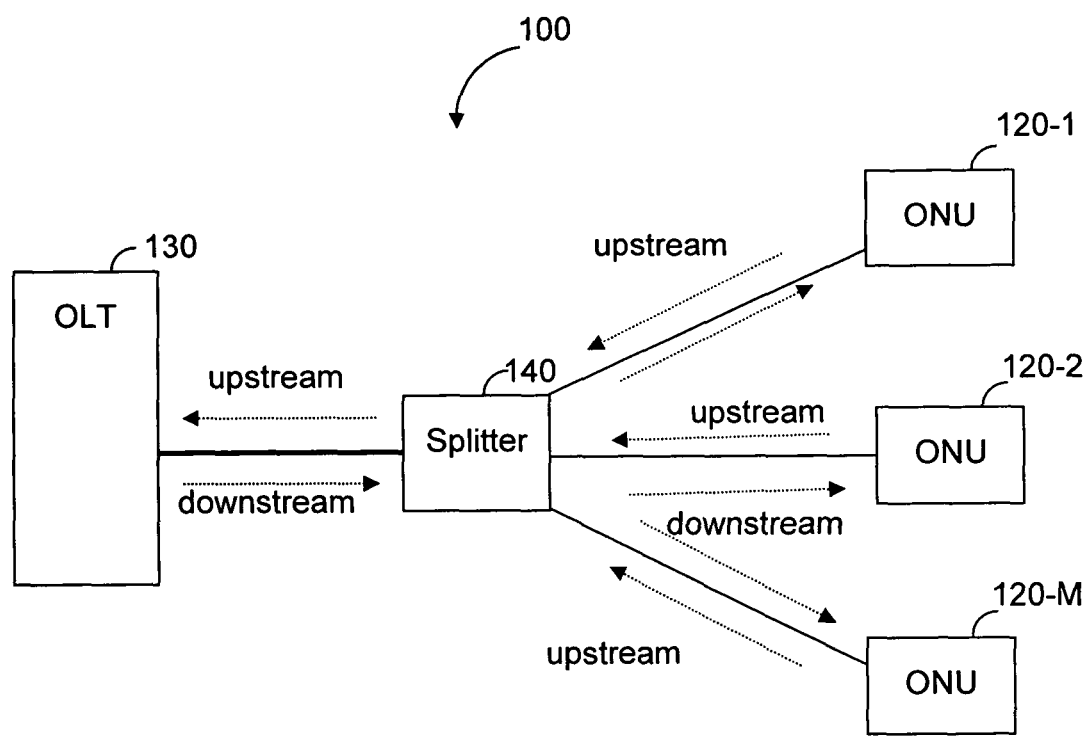
FIG. 1 is a diagram of a typical PON (prior art)
Figure 2:
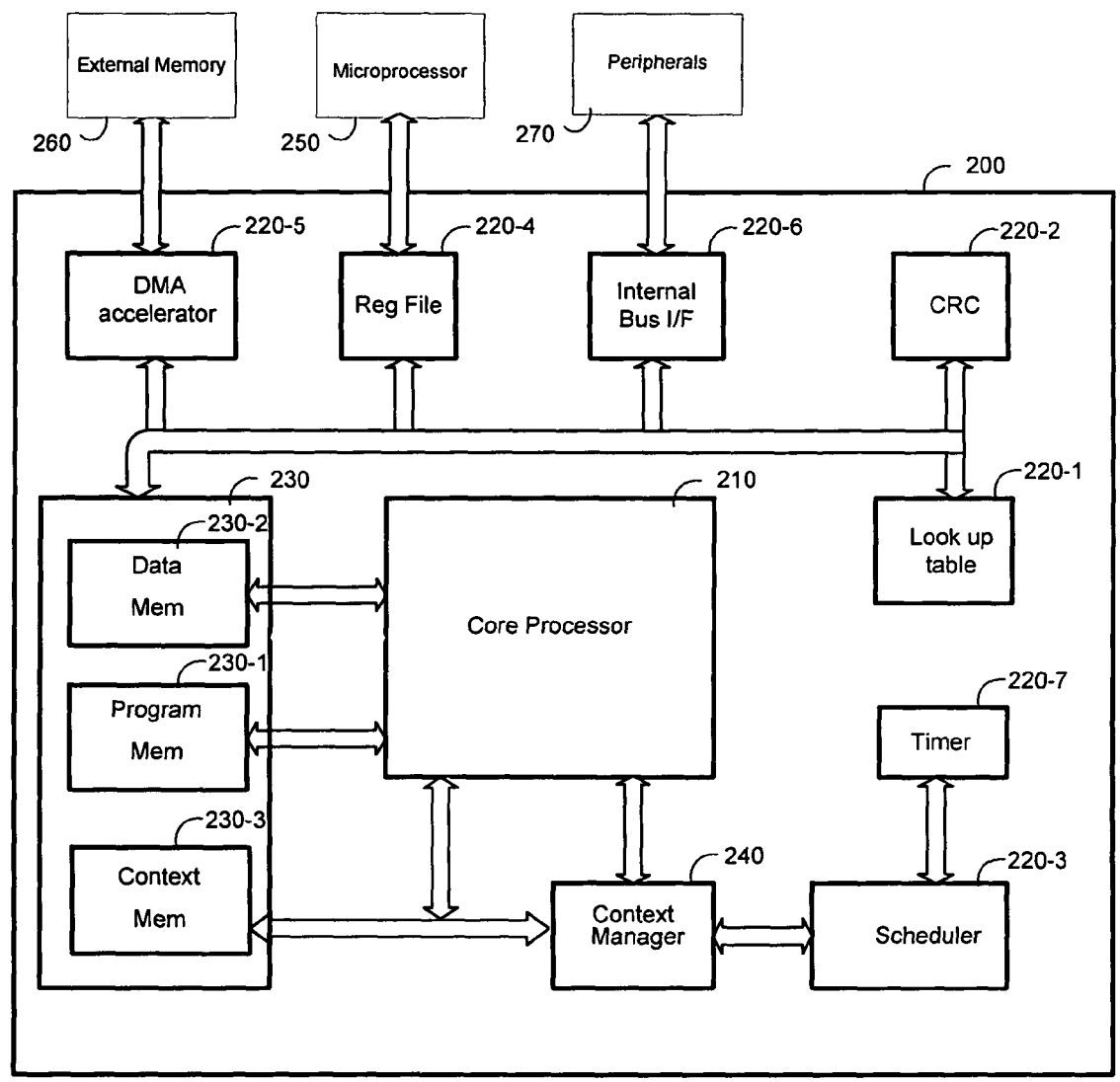
FIG. 2 is a block diagram of the PON packet processor in accordance with an exemplary embodiment of the present invention.

FIG. 2 shows a block diagram of a PON packet processor 200 disclosed in accordance with an exemplary embodiment of the present invention. The PON packet processor 200 is adapted to perform PON processing tasks, such as bridge learning, ATM queuing and shaping, reassembling of packets, and so on. These processing tasks are performed regardless of the PON type of the network. Namely, the PON packet processor 200 may handle traffic having the type of a Gigabit PON (GPON), a Broadband PON (BPON), an Ethernet PON, (EPON) or any combination thereof. Data processed by the PON packet processor 200 may be either an upstream flow, i.e., data sent from a subscriber device to an OLT or a downstream flow, i.e., data sent from an OLT to a subscriber device.

The packet processor 200 includes a core processor 210, a plurality of hardware (HW) accelerators 220-1 through 220-7, and a memory 230. The core processor 210 may be, for example, a RISC machine that designed to execute processing tasks with a minimal latency. For this purpose, all arithmetic and logic operations as well as source and destination variables are register based. The only operations that require access to the memory 230 are load and store operations. Furthermore, the core processor 210 is designed with separate channels dedicated respectively to program, data, and context accesses. Specifically, the memory units included in the memory 230 are high speed synchronous memories that are used for program, data and context. The program memory 230-1 is, for example, a read only memory that holds tasks' instructions. The program memory 230-1 is accessible by an external microprocessor 250. The data memory 230-2 is a read/write memory that keeps data of the various tasks. The context memory 230-3 holds instances of registers used by core processor 210. When switching contexts, the previous context is saved in memory 230-3 and a new context is fetched. The context memory 230-3 is also accessible by the external microprocessor 250. The context switching mechanism is controlled by a context manager 240 and will be described in greater detail below.

The HW accelerators 220 are dedicated hardware processing components designed to increase the performance of packet processor 200 by speeding up time-consuming tasks. These dedicated processing components include at least a lookup table 220-1, a cyclical redundancy checking (CRC) accelerator 220-2, a scheduler 220-3, a register file 220-4, a direct memory access (DMA) accelerator 220-5, an internal bus interface 220-6, and a timer 220-7. The lookup table 220-1 includes MAC addresses used for accessing both PON and Ethernet MAC adapters. Specifically, the lookup table 220-1 includes all learnt destination and source MAC addresses. Entries are added to the lookup table 220-1 by a learning process and removed from the lookup table 220-1 by an aging process. The learning process is triggered if a designated source address was not found in the lookup table 220-1. In addition, the lookup table 220-1 may be used in forwarding packets, filtering packets having unknown MAC addresses, and assigning of Virtual LAN (VLAN) tags.

The CRC accelerator 220-2 enables the fast CRC calculation for data received through the PON. The CRC accelerator 220-2 operates off line on data stored in data memory 230-2. Specifically, the CRC accelerator 220-2 includes at least five CRC engines (not shown) that are tailored to calculate the CRC of PON traffic. Typically, each CRC engine is capable of computing a different CRC polynomial. The CRC engines may be, but are not limited to, 32-CRC engine for computing the CRC over Ethernet and AAL5 frames, 10-CRC engine for calculating the CRC over OAM cells, 5-CRC utilized for AAL2 frames, and 16-BIP engine for computing parity bit of ATM cells. The core processor 210 instructs CRC accelerator 220-2 which CRC engine or engines are required for the computation. The DMA accelerator 220-5 is responsible for data transfer from and to the memory 230 and an external memory 260. The register file 220-4 includes all configuration and input/output (I/O) space register. Configuration registers can be read and written by the external microprocessor 250, while the I/O registers are for the core processor 210 internal uses. The scheduler 220-3 is coupled to different request generators 302-1 to 320-N (shown in FIG. 3) from which it receives requests and determines the next thread number to be executed based on a plurality of configurable criteria.

Figure 3:
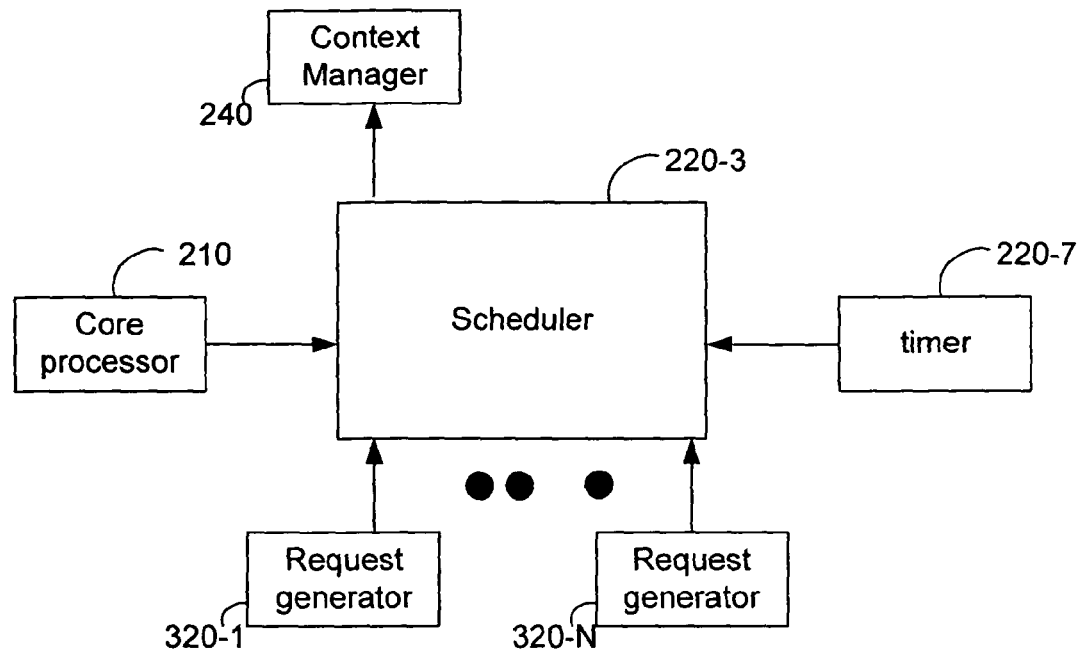
FIG. 3 is a block diagram showing the connections of the scheduler in accordance with one embodiment exemplary of the present invention.

FIG. 3 shows a block diagram used to describe the operation of the scheduler 220-3 disclosed in accordance with one exemplary embodiment of the present invention. The scheduler 220-3 is coupled to the context manager 240 and a plurality of request generators 320-1 through 320-N. The request generators 320 may be, but are not limited to, peripheral units 270 (e.g., MAC PON adapters, Ethernet PON adapters), the external microprocessor 250, the DMA accelerator 220-5, and the timer 220-7. Each generator 320 requests the scheduler 220-3 to invoke a specific thread to be executed by the core processor 210.

The core process 210 supports the execution of multiple threads, each of which runs a PON related task. For example, threads run over the core processor 210 include, but are not limited to, a PON RX thread for receiving traffic from an OLT, a PON TX for transmitting traffic to an OLT, an Ethernet RX for processing frames received from a subscriber device connected to an ONU, an Ethernet TX for constructing frames to be sent to a subscriber device, or any other user-defined threads. The execution of some of these threads is described in greater detail below. To ensure optimized performance while executing PON related tasks, the scheduler 220-3 is designed with dedicated mechanisms. These mechanisms comprise a priority-based selection of threads, zero-latency context switching, and the enablement of asynchronous and synchronous requests.

The request generators 320 generate and send to the scheduler 220-3 two types of requests for invoking a thread: asynchronous and synchronous. Asynchronous requests are arbitrarily generated by any peripheral unit 270, the timer 220-7, or by another thread as a result of a thread's activity. For example, a thread may either trigger itself directly or indirectly through a DMA command. A synchronous request is generated by the DMA accelerator 220-5. As can be understood from the above discussion the DMA accelerator 220-5 may be considered as a synchronous request generator, whereas the peripheral units 270 and the timer 220-7 are asynchronous request generators.

An asynchronous request includes an enable bit having a value controlled by the core processor 210. When the enable bit is set to a low logic value (i.e., disable), the scheduler 220-3 does not accept the request. This ensures that certain threads complete their execution. For example, a PON transmit task executes a DMA command, and thus can be invoked only at the end of this command. In this case, all the asynchronous requests are disabled and not served. However, the disabled requests are saved and served once the enable bit is set to a high value. Another indication that allows controlling requests for invoking threads is a mask indication. This indication masks an active thread, i.e., none of the request generators can call the masked thread.

Each thread may have one or more pending requests which are kept together with their status by the scheduler 220-3. In an embodiment of the present invention the decision which request to serve is performed by a priority-based selection algorithm. Specifically, during initialization each thread is configured with a priority, e.g., the priority may be the ID number of the thread. Furthermore, all threads are divided into a predefined number of priority groups. Generally, a higher priority request is always served before a lower priority request. However, the scheduler 220-3 may select a request of lower priority, if the lower priority request raises an urgent flag. The priority mechanism is designed to allow the PON packet processor 200 to process data with minimum latency, maximum bandwidth utilization, and minimum data loss. For example, the PON TX thread is assigned with a higher priority in order to avoid situations of transmitting IDLE cell when a T-CONT is granted. As another example, the Ethernet RX thread is set with a higher priority in order to avoid loss of frames. As yet another example, the ability to temporarily raise the priority of a specific thread (using the urgent flag) allows burst data to be handled efficiently. The priority policy of the scheduler 220-3 is designed to serve burst native communication protocols, e.g., a PON protocol. The PON packet processor 200 and the scheduler 220-3 are optimized to support maximum receive and transmit burst size. A person skilled in the art will note that other selection algorithms may be used by the scheduler 220-3. These algorithms include, but are not limited, to round-robin, weighted round-robin, and the like.

The ID number of the selected thread is sent to the context manager 310 prior to any context switching. The scheduler 220-3 may update its selection as long as context switching has not occurred. The context manager 240 unit is responsible for three functions: a) restoring the next thread registers from context memory 230-3 to a shadow register file; b) performing context switch; and c) saving the registers of a prior thread to the context memory 230-3.

Figure 4:
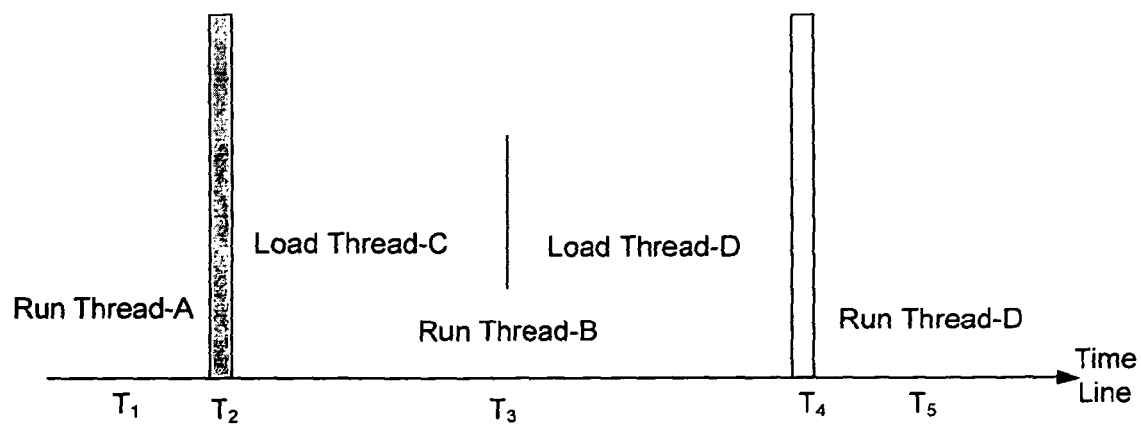
FIG. 4 is a time-diagram used for describing the operation of the zero-latency context switching mechanism in accordance with one exemplary embodiment of the present invention.

To allow zero-latency when switching context, a new thread is selected and its registers are fetched during the execution of a current thread. The context manager periodically triggers a new thread selection and starts fetching its registers. The next thread to be executed is the latest chosen thread whose registers were completely fetched. FIG. 4 provides an exemplary time-diagram for the operation of the zero-latency context switching mechanism. During time $T_1$, a thread-A runs, and subsequently, at time $T_2$, a single cycle context switch occurs between thread-A and thread-B. At time $T_3$, the new thread-B starts and thread-C is selected by scheduler 220-3. The actual thread switching between the previous thread-A and the current thread-B occurs while thread-B is active. That is, the registers that are related to thread-A are stored in the context memory 230-3, while the registers related to thread-C are fetched to a shadow register file simultaneously. Once the previous thread is stored and the next thread is ready, a check is made to determine if scheduler 220-3 updated its selection. In this example, thread-D is preferred as the next thread, and thus the process for fetching its registers to an alternate shadow register file is carried out, i.e., two shadow register files are utilized. If this process is not completed before the next context switch, then thread-C will be next the thread; otherwise, thread-D is executed. As shown, at time $T_4$ context switching occurs, and during time $T_5$ thread-D is executed. The scheduler 220-3 includes a mechanism for periodically checking of new requests. This allows the scheduler 220-3 selecting the latest highest priority request, and thus increasing the overall performance of the PON packet processor 200.

Figure 5:
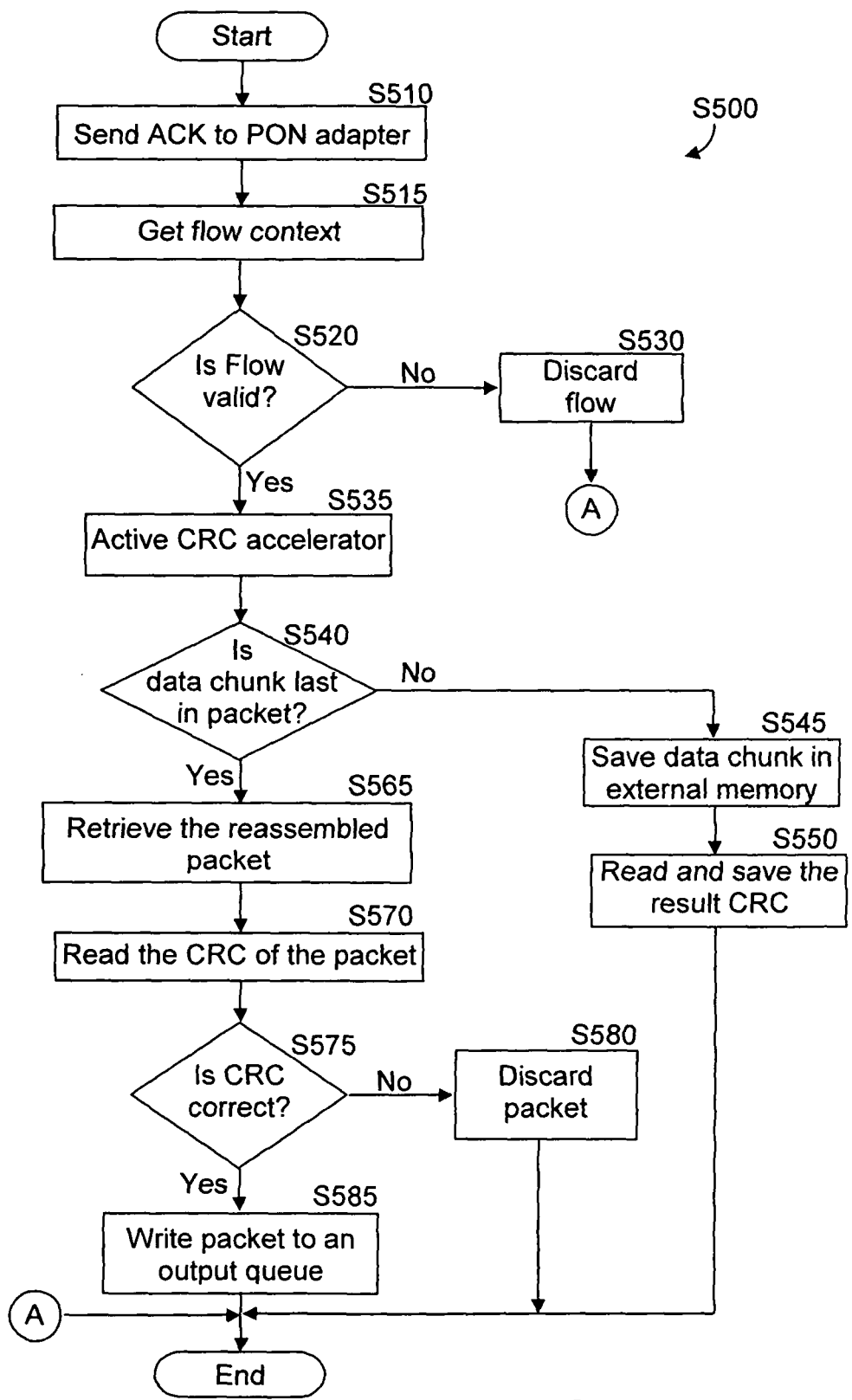
FIG. 5 is a flowchart for describing the execution of the PON RX thread in accordance with an exemplary embodiment of the present invention.

FIG. 5, shows a flowchart 500 used for describing the execution of the PON RX thread disclosed in accordance with a non-limiting and exemplary embodiment of the invention. The PON packet processor 200 executes the PON RX thread to reassemble data chunks belong to downstream data flows sent from an OLT to a subscriber device.

The execution of the PON RX thread is initiated by a PON MAC adapter, which sends an asynchronous request to scheduler 220-3. At S510, an acknowledge message is sent to the PON adapter. At S515, the flow context according to the flow-ID is retrieved from the context memory 230-3. At S520, a validity check is performed in order to determine the status of the flow, and if the flow is invalid then, at S530, the flow is discarded and execution terminates; otherwise, execution proceeds to S535. The validity check may be also performed by hardware filters embedded in the PON MAC adapter. At S535, the CRC accelerator 220-2 is instructed to perform a CRC check on the data saves in the data memory 230-2. At S540, another check is made to determine if the incoming data chunk is the last data chunk of a packet, and if so execution continues with S565; otherwise, execution proceeds to S545. At S545, an incoming data chunk is saved in the external memory 260. This is performed using a DMA command and by means of the DMA accelerator 220-5. During the execution of the DMA command all incoming requests are masked. At S550, the result of the CRC calculation is read and the residue is stored.

At S565, the reassembled packet is retrieved. This is performed using a DMA command and by means of the DMA accelerator 220-5. During the execution of the DMA command all asynchronous requests are disabled, i.e., core processor 210 waits for the completion of the data transfer. At S570, the result of the CRC calculation is obtained from the CRC accelerator 220-2 and, at S575, the calculated CRC value is compared to the CRC of the reassembled packet. If the comparison result states inequality, then at S580 the packet is discarded and execution terminates; otherwise, at S585 the packet along with its descriptor is written to an output buffer. Packets in the output buffer are ready to be forwarded to Ethernet MAC adapter. Once the PON packet processor 210 writes the reassembled packet in the output buffer it is ready to receive a new packet from the PON MAC adapter.

Figure 6:
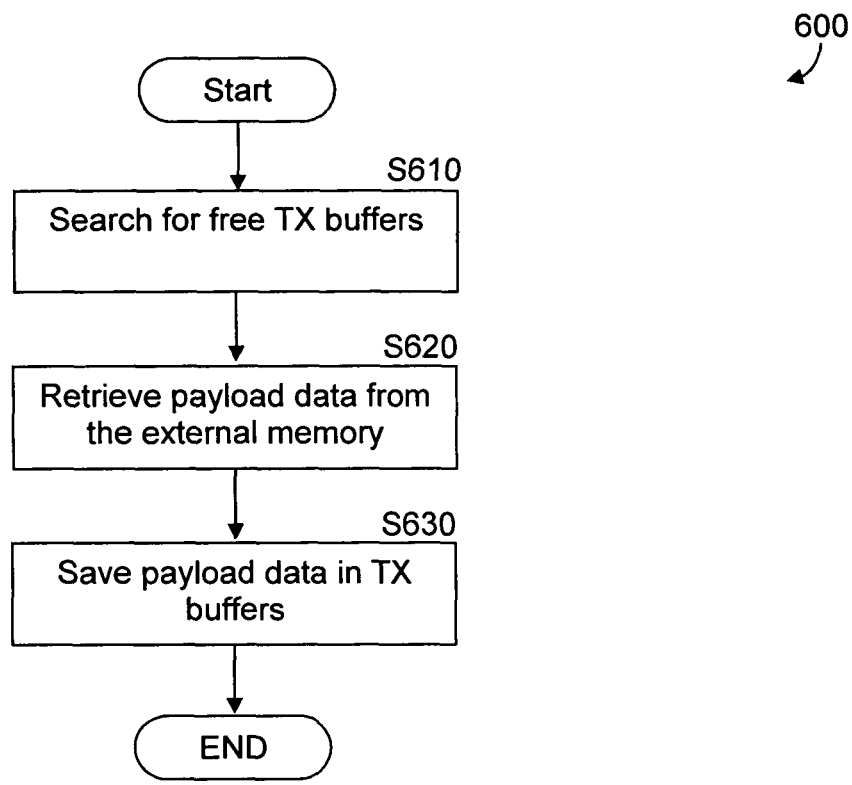
FIG. 6 is a flowchart for describing the execution of the PON TX thread in accordance with an exemplary embodiment of the present invention.

FIG. 6, shows a flowchart 600 used for describing the execution of the PON TX thread disclosed in accordance with a non-limiting and exemplary embodiment of the present invention. The PON packet processor 200 executes the PON TX thread to fill TX buffers of a specific TCONT. The thread is initiated once all Ethernet frames of an upstream flow are reassembled into packets in the external memory 260. At S610, a search for a free TX buffer is performed. The TX buffers are a set of prioritized buffers, each of which represents a single priority queue that is connected to a specific T-CONT. A T-CONT is a virtual upstream channel to which bandwidth is granted by the OLT. A single T-CONT can be allocated for an ONU, a class of service (CoS), or a logical ONU. TX buffers reside in data memory 230-2. Once a free TX buffer is found, at S620, the payload date of a reassembled packet residing in the external memory 260 is retrieved. This is performed using a DMA command and by means of the DMA accelerator 220-5. During the execution of the DMA command all asynchronous requests are disabled, i.e., core processor 210 waits for the completion of the data transfer. At S630, the payloads are saved in data memory 230-2 in the TX buffers. Upon a request from a PON MAC adapter the content of TX buffers associated with a specific T-CONT is sent to the adapter.

The invention claimed is:
1. A passive optical network (PON) packet processor for processing PON traffic, said PON packet processor comprising:
    a core processor configured to execute a plurality of threads related to said processing of said PON traffic, said PON traffic comprising upstream data including Ethernet frames and downstream data chunks;

a plurality of hardware (HW) accelerators, coupled to said core processor, configured to accelerate and to optimize execution of said plurality of threads, said plurality of HW accelerators being configured to accelerate execution of said plurality of threads as compared to executing said plurality of threads using only said core processor, wherein a first HW accelerator of said plurality of HW accelerators comprises:
a scheduler having a first mechanism configured to perform priority-based selection of said plurality of threads and a second mechanism configured to enable requests for execution of said plurality of threads; and
a memory unit, coupled to said core processor, that stores program and traffic data.

2. The PON packet processor of claim 1, wherein a second HW accelerator of said plurality of HW accelerators comprises:
a media access control (MAC) address search engine, a cyclical redundancy checking (CRC) accelerator, a register file, a direct memory access (DMA) accelerator, an internal interface, or a timer.

3. The PON packet processor of claim 2, wherein said CRC accelerator comprises:
a plurality of CRC engines, wherein each of said plurality of CRC engines is configured to compute a different CRC polynomial.

4. The PON packet processor of claim 2, wherein said DMA accelerator is configured to allow data transfers between said memory unit and an external memory.

5. The PON packet processor of claim 1, wherein said scheduler is configured to enable selection of a selected thread of said plurality of threads to be executed by said core processor based on a priority-based selection of said selected thread and a type of a request.

6. The PON packet processor of claim 5, further comprising:
a plurality of request generators, coupled to said scheduler, configured to generate said requests for invoking said plurality of threads; and
a context manager, coupled to said scheduler, configured to control context switching between said plurality of threads.

7. The PON packet processor of claim 6, wherein at least one of said plurality of request generators comprises:
a direct memory access (DMA) accelerator, said core processor, a timer, an external microprocessor, or one or more peripheral units.

8. The PON packet processor of claim 6, wherein at least one of said plurality of request generators comprises:
one or more peripheral units, said core processor, said timer, or an external microprocessor,
wherein said at least one of said plurality of request generators is configured to arbitrarily generate an asynchronous request.

9. The PON packet processor of claim 7, wherein at least one of said plurality of request generators comprises:
said DMA accelerator,
wherein said at least one of said plurality of request generators is further configured to generate a synchronous request.

10. The PON packet processor of claim 6, wherein said context manager is configured to be provided with an identification (ID) number of said selected thread.

11. The PON packet processor of claim 1, wherein said scheduler is configured to increase a priority of said selected thread to handle burst PON traffic.

12. The PON packet processor of claim 5, wherein said scheduler is configured to reject disabled requests and masked requests.

13. The PON packet processor of claim 6, wherein said context manager is configured to:
fetch a context of said selected thread upon receiving an identification (ID) number of said selected thread; and
switch context between said selected thread and a currently executed thread of said plurality of threads.

14. The PON packet processor of claim 13, wherein said context manager is configured to switch context at approximately zero latency.

15. The PON packet processor of claim 5, wherein said plurality of threads comprise:
an Ethernet transmit (TX) thread configured to construct Ethernet frames to be sent to a subscriber device coupled to said PON packet processor,
an Ethernet receive (RX) thread configured to process Ethernet frames received from said subscriber device,
a PON TX thread configured to transmit said PON traffic to said optical line terminal (OLT), or
a PON RX thread configured to receive said PON traffic from said OLT.

16. The PON packet processor of claim 15, wherein said core processor comprises:
an Ethernet media access control (MAC) adapter configured to receive data chunks of Ethernet frames sent from a subscriber device,
wherein said core processor is further configured to reassemble said data chunks into a data packet,
send said data packet to a PON MAC adapter; and
transmit said data packet to said OLT based upon a grant from an OLT to execute said PON TX thread.

17. The PON packet processor of claim 15, wherein said core processor is further configured to:
receive data chunks sent from an OLT of an optical network;
reassemble said data chunks into a data packet;
perform correctness checks of said data packet; and
forward said packet to a subscriber device through an Ethernet MAC adapter to execute said PON RX thread.

18. A method of executing passive optical network (PON) traffic processing related threads, said method comprising:
receiving requests for invoking said PON traffic processing related threads, wherein each of said PON traffic processing related thread is at least one of: an Ethernet transmit (TX) thread to construct Ethernet frames to be sent to a subscriber device coupled to an optical line unit (ONU), an Ethernet receive (RX) thread to process Ethernet frames received from said subscriber device connected, a PON transmit (TX) thread to transmit traffic to an optical line terminal (OLT), or a PON receive (RX) thread to receive traffic from said OLT;
selecting a thread of said PON traffic processing related threads to be executed based on a priority policy and a request to execute said PON traffic processing related threads
executing said selected thread using a hardware (HW) accelerator that is separate from a core processor, said executing of said selected thread using said HW accelerator being accelerated as compared to executing said thread using only said core processor; and
sending an identification (ID) number of said selected thread.

19. The method of claim 18, wherein said received requests comprise asynchronous requests and synchronous requests.

20. The method of claim 19, wherein said asynchronous requests are generated by at least one of: said core processor, said timer, said external microprocessor, or one or more peripheral devices.

21. The method of claim 19, wherein said synchronous requests are generated by said DMA accelerator.

22. The method of claim 19, further comprising:
rejecting disabled requests and masked requests.

23. The method of claim 22, further comprising:
increasing a priority of said selected thread to handle burst PON traffic.

24. The method of claim 18, further comprising:
fetching a context of said selected thread upon receiving said ID number; and
switching context between said selected thread and a current executed thread of said PON traffic processing related threads.

25. The method of claim 24, wherein said switching context comprises:
switching context at approximately zero latency.

* * * * *

UNITED STATES PATENT AND TRADEMARK OFFICE
CERTIFICATE OF CORRECTION

PATENT NO.         : 9,059,946 B2
APPLICATION NO.    : 11/349917
DATED              : June 16, 2015
INVENTOR(S)        : Levy et al.

It is certified that error appears in the above-identified patent and that said Letters Patent is hereby corrected as shown below:

In the claims

In column 8, line 58, claim 18, replace "threads" with --threads;--.

Signed and Sealed this
Twentieth Day of October, 2015

Michelle K. Lee
*Director of the United States Patent and Trademark Office*